(12) United States Patent
Wang et al.

(10) Patent No.: US 10,461,563 B2
(45) Date of Patent: Oct. 29, 2019

(54) SCREEN AND DEVICE COMPRISING THE SCREEN

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhiyong Wang, Beijing (CN); Qing Zhao, Beijing (CN); Shuai Xu, Beijing (CN); Lei Guo, Beijing (CN); Zhengxin Zhang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 104 days.

(21) Appl. No.: 15/526,379

(22) PCT Filed: Apr. 14, 2016

(86) PCT No.: PCT/CN2016/079304
§ 371 (c)(1),
(2) Date: May 12, 2017

(87) PCT Pub. No.: WO2017/143648
PCT Pub. Date: Aug. 31, 2017

(65) Prior Publication Data
US 2018/0062412 A1 Mar. 1, 2018

(30) Foreign Application Priority Data
Feb. 22, 2016 (CN) .......................... 2016 1 0095264

(51) Int. Cl.
*H02J 7/02* (2016.01)
*H02J 50/10* (2016.01)
(Continued)

(52) U.S. Cl.
CPC ................ *H02J 7/02* (2013.01); *G06F 3/047* (2013.01); *G06F 3/0416* (2013.01);
(Continued)

(58) Field of Classification Search
USPC ......................................................... 320/108
See application file for complete search history.

(56) References Cited

U.S. PATENT DOCUMENTS

2010/0219693 A1* 9/2010 Azancot .................. H02J 5/005
307/104
2010/0320968 A1 12/2010 Sip et al.
(Continued)

FOREIGN PATENT DOCUMENTS

CN 101931260 12/2010
CN 102654801 9/2012
(Continued)

OTHER PUBLICATIONS

International Search Report from corresponding PCT Application No. PCT/CN2016/079304 dated Nov. 28, 2016 (5 pages).
(Continued)

*Primary Examiner* — Bryce M Aisaka
(74) *Attorney, Agent, or Firm* — Harness, Dickey & Pierce, P.L.C.

(57) ABSTRACT

Embodiments of the present disclosure provide a screen and a device comprising the screen. The screen comprises: an induction current generation circuit configured to generate an induction current; an induction current transmission circuit connected to the induction current generation circuit and configured to transmit the induction current; and a control circuit connected to the induction current transmission circuit and configured to control the transmission of the induction current. The device comprises the screen described above, and the device further comprises a charging circuit connected to the induction current transmission circuit and the battery and configured to rectify the induction current so as to charge the battery. The screen according to the embodiments of the present disclosure and the device comprising the screen can provide a charging current for the battery of the electronic product by using a circuit built in the screen.

12 Claims, 6 Drawing Sheets

(51) Int. Cl.
*H02J 50/70* (2016.01)
*G06F 3/047* (2006.01)
*H02J 7/00* (2006.01)
*G06F 3/041* (2006.01)

(52) U.S. Cl.
CPC ............ *H02J 7/0052* (2013.01); *H02J 7/025* (2013.01); *H02J 50/10* (2016.02); *H02J 50/70* (2016.02)

(56) References Cited

U.S. PATENT DOCUMENTS

| | | | |
|---|---|---|---|
| 2012/0217944 A1* | 8/2012 | Wada | G01R 19/0092 323/282 |
| 2014/0015337 A1 | 1/2014 | Takeuchi et al. | |
| 2014/0232325 A1 | 8/2014 | Jung et al. | |
| 2014/0291404 A1 | 10/2014 | Matsuoka et al. | |
| 2016/0087482 A1 | 3/2016 | Wang | |

FOREIGN PATENT DOCUMENTS

| | | |
|---|---|---|
| CN | 103503276 | 1/2014 |
| CN | 103997075 | 8/2014 |
| CN | 103997111 | 8/2014 |
| CN | 104199576 | 12/2014 |
| CN | 203982340 U | 12/2014 |

OTHER PUBLICATIONS

Written Opinion from corresponding PCT Application No. PCT/CN2016/079304 dated Nov. 28, 2016 (3 pages).
Office Action from corresponding Chinese Application No. 201610095264.9 dated Nov. 3, 2017 (6 pages).
Office Action from Chinese Application No. 201610095264.9 dated Oct. 8, 2018 (7 pages).

* cited by examiner

SCREEN AND DEVICE COMPRISING THE SCREEN

CROSS-REFERENCE TO RELATED APPLICATION

This patent application claims priority of Chinese Patent Application No. 201610095264.9, filed on Feb. 22, 2016, the entire content of which is incorporated by reference herein as part of the present application.

BACKGROUND

The present disclosure relates to charging technology, and in particular, to a screen and a device comprising the screen.

Electronic products need to consume electric energy to achieve a variety of functions, and portable electronic products such as mobile phones, PAD and the like, can only be provided with electric energy through the battery. For such products, the available amount of electricity in the battery is particularly important. To increase the battery volume in order to increase the overall capacity of the battery will result in a too big product size, and the technology to improve the battery capacity per unit volume has no breakthrough. In the case where it is difficult to enhance the overall capacity of the battery, it is necessary to quickly charge the battery so as to meet the use needs as much as possible.

The current fast charging technology requires the use of a dedicated charging device with high voltage or high current output to charge electronic products, which increases the cost of the external charging device and reduces the generality of the charging device for electronic products.

BRIEF SUMMARY

Embodiments of the present disclosure provide a screen and a device comprising the screen, which can be used for battery charging.

According to a first aspect of the present disclosure, there is provided a screen comprising: an induction current generation circuit configured to generate an induction current; an induction current transmission circuit connected to the induction current generation circuit and configured to transmit the induction current; and a control circuit connected to the induction current transmission circuit and configured to control the transmission of the induction current.

In an embodiment of the present disclosure, the induction current generation circuit comprises a plurality of metal wires arranged in parallel.

In an embodiment of the present disclosure, the plurality of metal wires are touch signal lines.

In an embodiment of the present disclosure, the plurality of metal wires are data signal lines.

In an embodiment of the present disclosure, the induction current transmission circuit comprises a plurality of transistors and a plurality of connection lines, and the transistors are connected to the corresponding metal wires through the connection lines.

In an embodiment of the present disclosure, the plurality of metal wires in the induction current generation circuit are connected in parallel, in response to that the plurality of transistors are switched on.

In an embodiment of the present disclosure, the plurality of metal wires in the induction current generation circuit are connected in series to form a multi-turn coil, in response to that the plurality of transistors are switched on.

In an embodiment of the present disclosure, the control circuit is configured to switch on the plurality of transistors, in response to that the charging function of the screen is started and the screen is in a sleep state.

According to a second aspect of the present disclosure, there is provided a device comprising a screen of any one of the preceding, the device further comprising a charging circuit connected to the induction current transmission circuit and the battery, and configured to rectify the induction current so as to charge the battery.

The screen according to the embodiment of the present disclosure and the device comprising the screen can provide a charging current for the battery of the electronic product by using a circuit built in the screen. The charging current can independently charge the battery and also can be used in cooperation with an existing external charging device to increase the charging current received by the battery and improve the charging speed of the battery. The screen of the embodiment of the present disclosure and the device comprising the screen do not affect the generality of the electronic product while increasing the charging speed.

BRIEF DESCRIPTION OF THE DRAWINGS

In order to more clearly illustrate the technical solutions of the embodiments of the present disclosure, the drawings of the embodiments will be briefly described below. It should be understood that the drawings described below merely relate to some embodiments of the present disclosure rather than limiting the present disclosure, in which.

DETAILED DESCRIPTION

To make the technical solutions, and advantages of the present disclosure more clear, the technical solutions of the embodiments of the present disclosure will be clearly and completely described below in conjunction with the drawings. Obviously, the embodiments described are part of embodiments of the present disclosure, instead of all the embodiments. Based on the described embodiments of the present disclosure, all other embodiments obtained by those skilled in the art without creative work also fall within the scope of protection sought for by the present disclosure.

Figure 1:
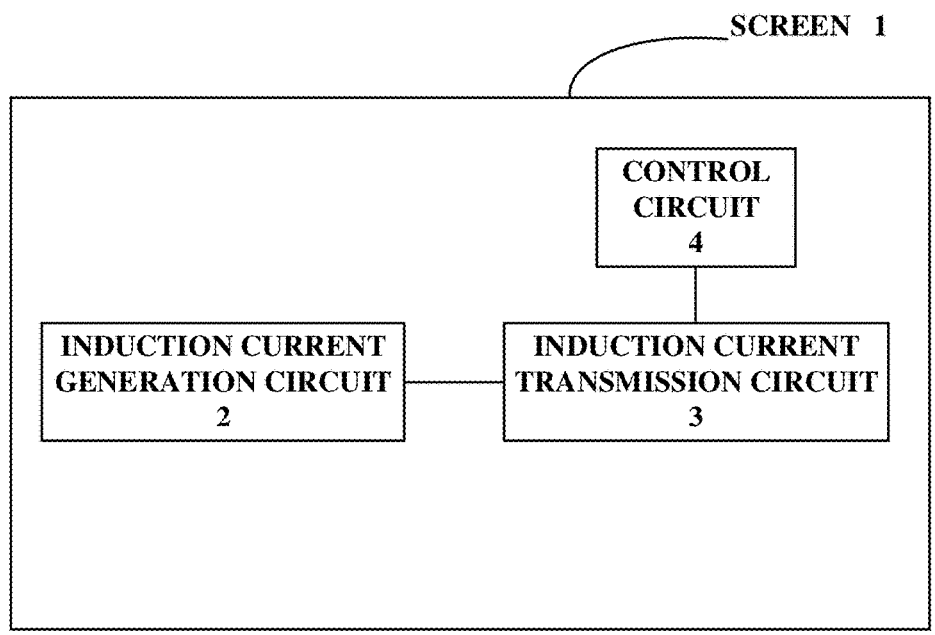
FIG. 1 is a block diagram showing the structure of a screen according to a first embodiment of the present disclosure.

FIG. 1 is a block diagram showing the structure of a screen according to a first embodiment of the present disclosure. As shown in FIG. 1, the screen 1 comprises: an induction current generation circuit 2 configured to generate an induction current; an induction current transmission circuit 3 connected to the induction current generation circuit 2 and configured to transmit the induction current; and a control circuit 4 connected to the induction current transmission circuit 3 and configured to control the transmission of the induction current.

Under the control of the control circuit 4, the induction current generated by the induction current generation circuit 2 can be transmitted from the induction current transmission circuit 3 to the outside of the screen 1 for charging the battery.

Figure 2:
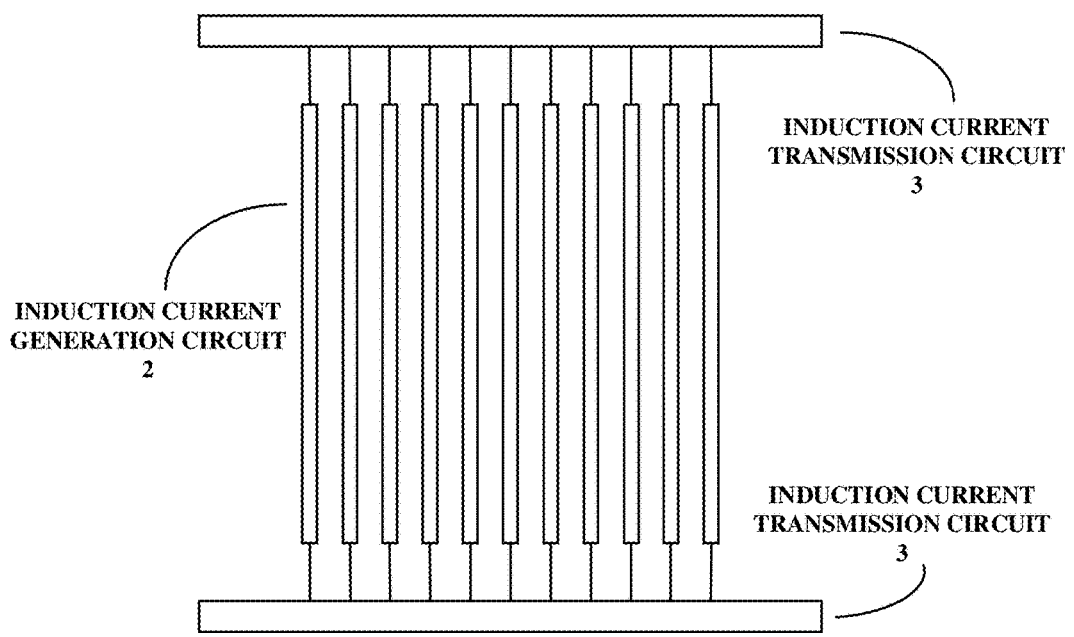
FIG. 2 is a schematic diagram of the structure of an induction current generation circuit of the screen shown in FIG. 1.

FIG. 2 is a schematic diagram of the structure of the induction current generation circuit of the screen shown in FIG. 1. As shown in FIG. 2, the induction current generation circuit 2 may comprise a plurality of metal wires arranged in parallel. The metal wires can be used to cut magnetic field lines to generate the induction current.

Since there are a variety of wirings arranged in parallel in a variety of screens such as a display screen, a touch screen, or a touch display screen, the use of a plurality of metal wires arranged in parallel in this example to generate an induction current has a number of advantages. First of all, the plurality of metal wires arranged in parallel in this example may reuse a variety of existing wirings. For example, when applied to a screen having a touch function, the plurality of metal wires may be touch signal lines, or when applied to a screen having a display function, the plurality of metal wires may be data signal lines. The multiplexing when a variety of existing wirings are in a non-working state will not affect the existing functions and can reduce the newly added circuit elements. In addition, it is also possible to add one circuit layer on the basis of the existing screen for realizing the induction current generation circuit 2. In this case, it is possible to make the plurality of metal wires in the induction current generation circuit 2 overlap with the existing wirings so as not to affect the light transmission performance of the existing screen.

In an embodiment of the present disclosure, the induction current transmission circuit 3 may comprise a plurality of transistors and a plurality of connection lines, and the transistors are connected to the corresponding metal wires through the connection lines. The plurality of transistors and the plurality of connection lines in the induction current transmission circuit 3 may be connected in different ways depending on the specific manner in which the plurality of metal wires generate the induction current.

Figure 3:
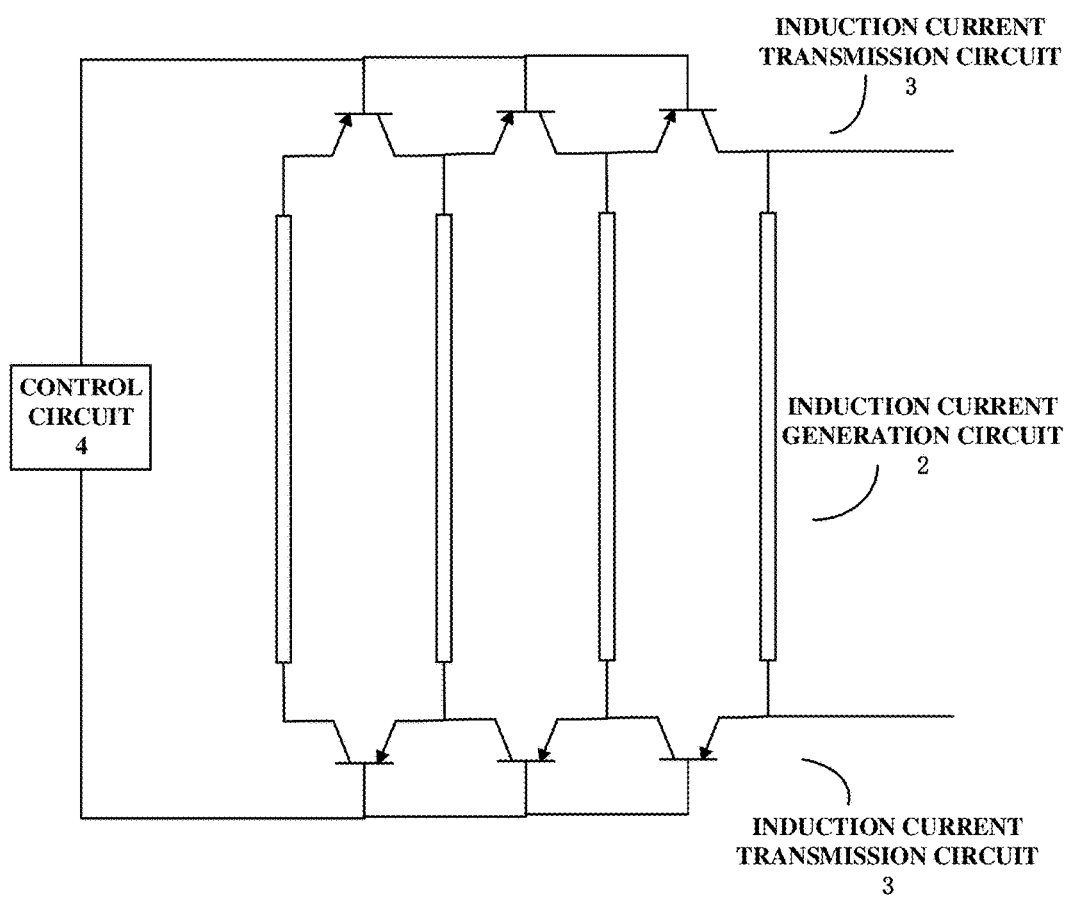
FIG. 3 is a schematic diagram of a first structure of an induction current transmission circuit of the screen shown in FIG. 1.

FIG. 3 is a schematic diagram of a first structure of the induction current transmission circuit of the screen shown in FIG. 1. As shown in FIG. 3, when the plurality of transistors are switched on, the plurality of metal wires in the induction current generation circuit are connected in parallel. When the plurality of metal wires are cutting the magnetic lines, if the motion thereof is in the same direction relative to the magnetic lines, the generated current flows in the same direction. The plurality of metal wires are connected in parallel so that the current can be added and outputted.

Figure 4:
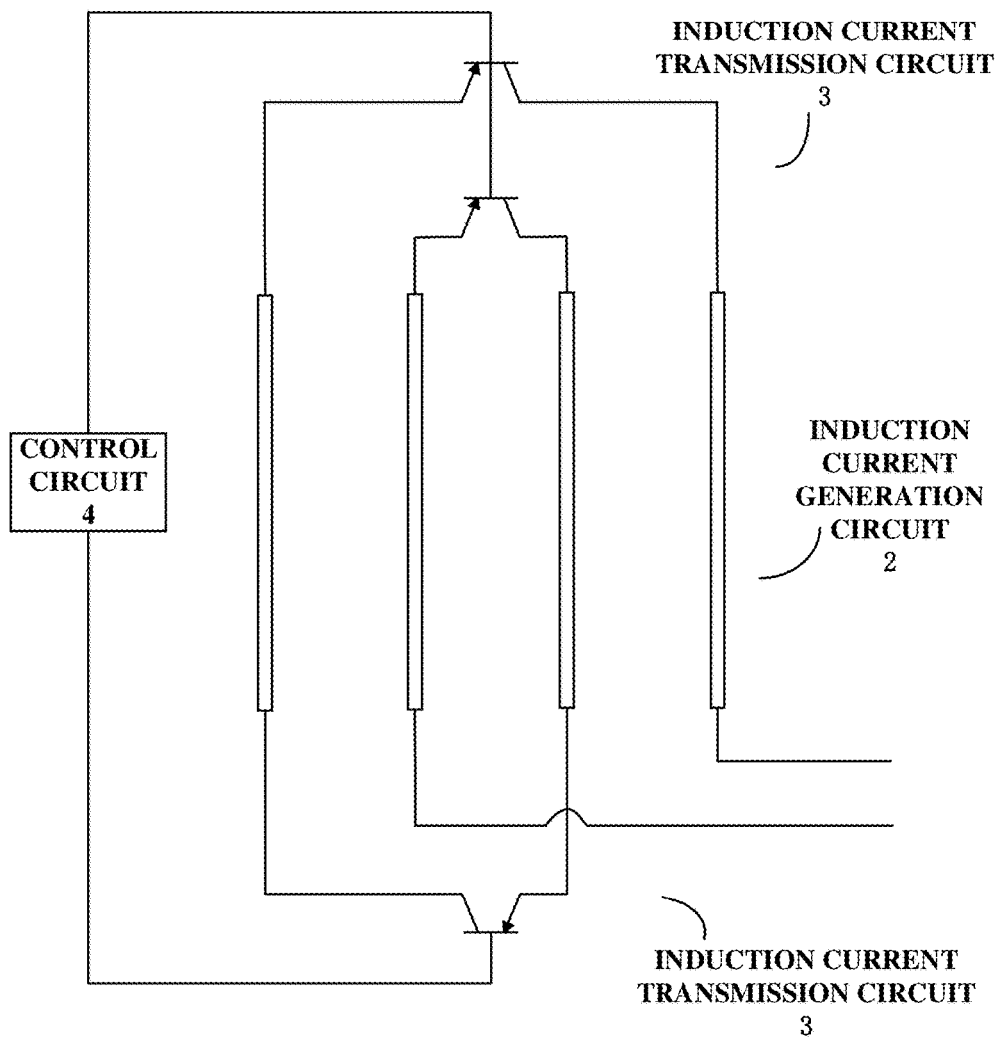
FIG. 4 is a schematic diagram of a second structure of the induction current transmission circuit of the screen shown in FIG. 1.

FIG. 4 is a schematic diagram of a second structure of the induction current transmission circuit of the screen shown in FIG. 1. As shown in FIG. 4, when the plurality of transistors are switched on, the plurality of metal wires in the induction current generation circuit are connected in series and form a multi-turn coil. When the plurality of metal wires are cutting the magnetic lines, if the motion thereof is in different directions relative to the magnetic lines, the generated current flows in different directions. The plurality of metal wires are connected in series so that the current can be added and outputted.

It should be understood that if one circuit layer is added directly on the basis of an existing screen for realizing the induction current generation circuit 2, it is also possible to directly connect a plurality of metal wires to form a parallel or series structure without using a transistor.

Figure 5:
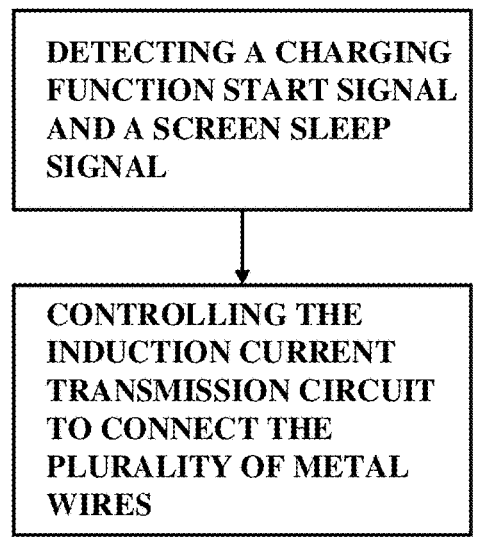
FIG. 5 is a schematic work flow diagram of a control circuit of the screen shown in FIG. 1.

FIG. 5 is a schematic work flow diagram of a control circuit of the screen shown in FIG. 1. As shown in FIG. 5, the control circuit is configured to switch on the plurality of transistors when the charging function of the screen is started and the screen is in a sleep state. When existing wirings are reused, waiting for the screen to sleep can prevent conflicts with the original functionality of the existing wirings. When not reused, it is possible not to wait for the screen to sleep and carry out the charging, and in this case, the advantage of charging after waiting for the screen to sleep is to prevent the charging process from interfering the work of the existing wirings. The start state of the charging function and the sleep state of the screen can be provided by the processor in the device, and also can be directly detected by a sensor.

Figure 6:
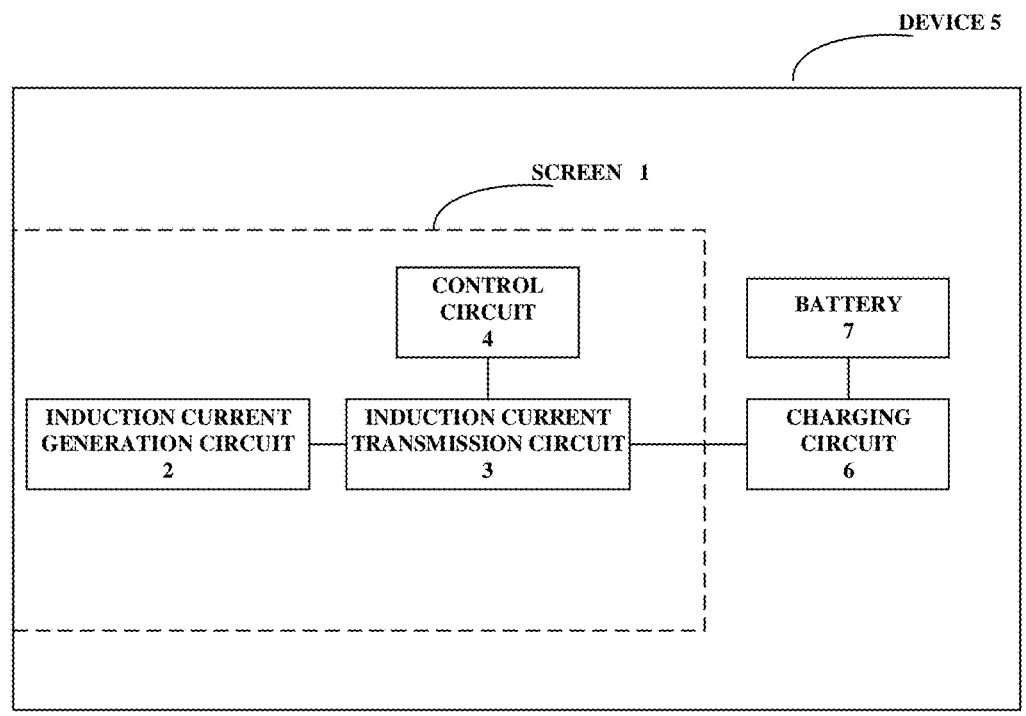
FIG. 6 is a block diagram showing the structure of a device according to a second embodiment of the present disclosure.

FIG. 6 is a block diagram showing the structure of a device according to a second embodiment of the present disclosure. As shown in FIG. 6, the device 5 comprises the above-described screen 1, and further comprises a charging circuit 6 which is connected to the induction current transmission circuit 3 and the battery 7, and is configured to rectify the induction current to charge the battery 7.

The screen 1 and the device 5 provided by the embodiment of the present disclosure can realize the conversion of the mechanical energy to the electric energy as long as they are located in the magnetic field and cut the magnetic lines, thereby generating an induction current for charging the battery.

Figure 7:
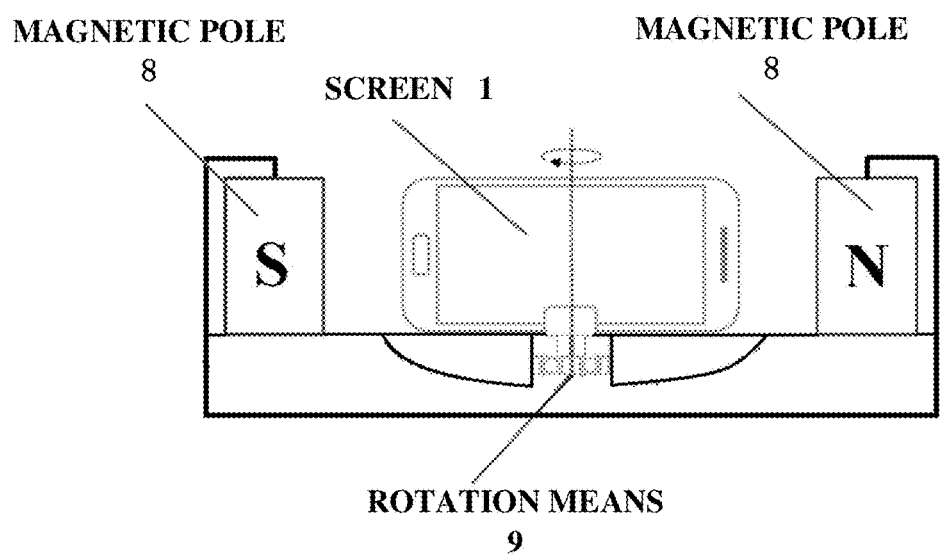
FIG. 7 is a schematic diagram of the structure of the device shown in FIG. 6 in a charged state.

FIG. 7 is a schematic diagram of the structure of the device shown in FIG. 6 in a charged state. As shown in FIG. 7, a fixed magnetic pole 8 provides a magnetic field, and a rotation means 9 causes the device 5 to rotate in the magnetic field. The plurality of metal wires of the induction current generation circuit 2 of the screen 1 cut the magnetic lines to generate an induction current. It should be understood that it may be the magnetic pole 8 which rotates or moves around the device 5, as long as the plurality of metal wires cut the magnetic lines to generate an induction current. The magnetic pole 8 may be placed in any form. The rotary axis also may not be the axis of symmetry axis of the device 5, and the rotary axis may be outside the device 5.

Figure 8:
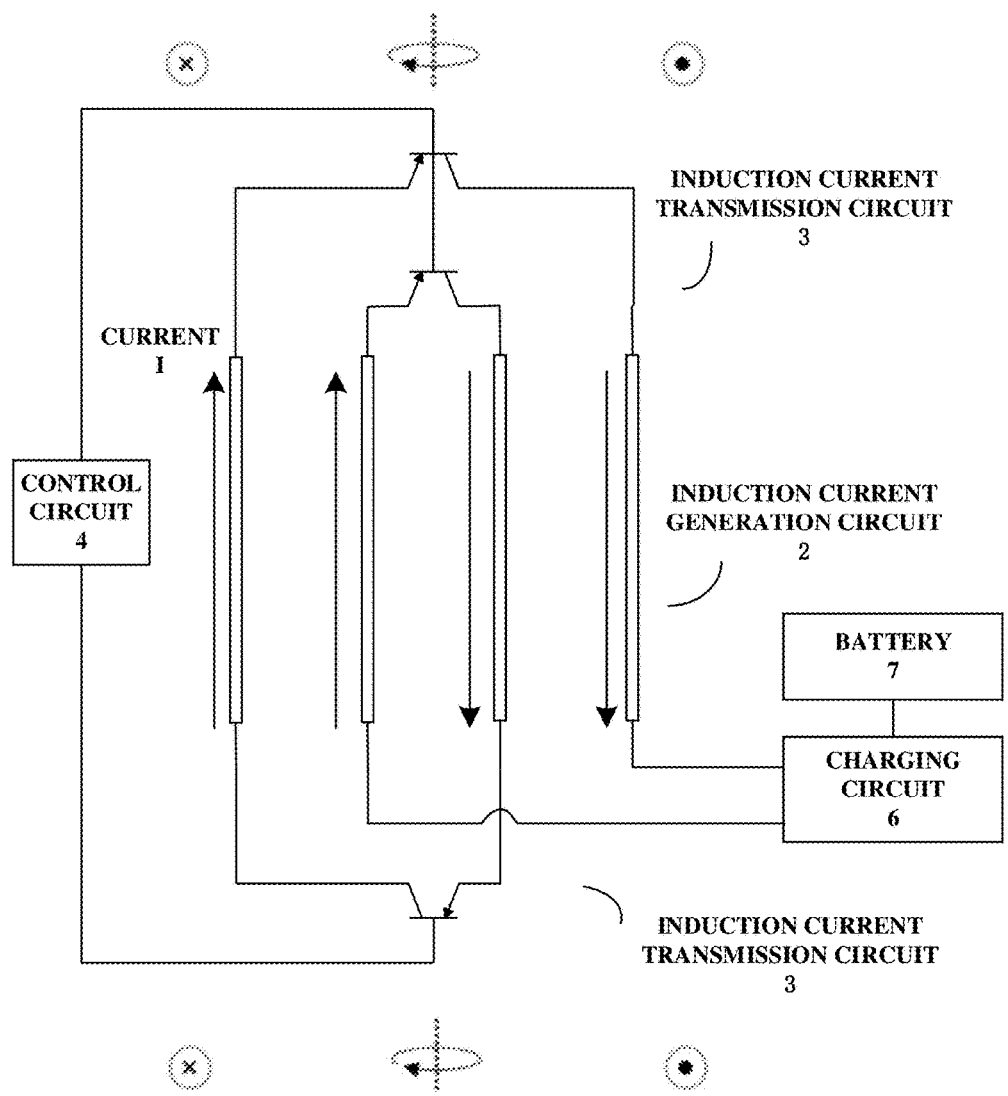
FIG. 8 is a schematic circuit diagram corresponding to FIG. 7.

FIG. 8 is a schematic circuit diagram corresponding to FIG. 7. As shown in FIG. 8, when the plurality of transistors of the induction current transmission circuit 3 are switched on, the plurality of metal wires in the induction current generation circuit 2 are connected in series to form a multi-turn coil. Since when the plurality of metal wires are cutting the magnetic lines, the motion thereof relative to the magnetic lines is in different directions, the generated current I flows in different directions, it is necessary to connect the plurality of metal wires in series so that the current can be added and outputted. The induction current is thereafter outputted to the charging circuit 6 of the device 5, and charge the battery 7 after being rectified. The charging current can independently charge the battery 7, and also can be used in cooperation with an existing external charging device to increase the charging current received by the battery and increase the charging speed of the battery.

It may be understood that the above embodiments are merely exemplary embodiments for the purpose of illustrating the principles of the present disclosure, but the present disclosure is not limited thereto. Those of ordinary skill in the art may make various modifications and improvements without departing from the spirit and essence of the present disclosure, which are also considered to be within the scope of protection sought for by the present disclosure.

What is claimed is:

1. A screen comprising:
    an induction current generation circuit configured to generate an induction current, the induction current generation circuit including a plurality of metal wires arranged in parallel, and the plurality of metal wires comprising touch signal lines;
    an induction current transmission circuit connected to the induction current generation circuit and configured to transmit the induction current; and
    a control circuit connected to the induction current transmission circuit and configured to control the transmission of the induction current.

2. The screen according to claim 1, wherein the plurality of metal wires further comprise data signal lines.

3. A device comprising a screen according to claim 1, wherein the device further comprises a charging circuit connected to the induction current transmission circuit and a battery, and configured to rectify the induction current to charge the battery.

4. The device according to claim 3, wherein the plurality of metal wires further comprise data signal lines.

5. The device according to claim 3, wherein the induction current transmission circuit comprises a plurality of transistors and a plurality of connection lines, and the transistors are connected to the corresponding metal wires through the connection lines.

6. The device according to claim 5, wherein the plurality of metal wires in the induction current generation circuit are connected in parallel when the plurality of transistors are switched on.

7. The device according to claim 5, wherein the plurality of metal wires in the induction current generation circuit are connected in series to form a multi-turn coil when the plurality of transistors are switched on.

8. The device according to claim 5, wherein the control circuit is configured to switch on the plurality of transistors when the charging function of the screen is started and the screen is in a sleep state.

9. A screen comprising:
    an induction current generation circuit configured to generate an induction current, the induction current generation circuit including a plurality of metal wires arranged in parallel;
    an induction current transmission circuit connected to the induction current generation circuit and configured to transmit the induction current, wherein the induction current transmission circuit comprises a plurality of transistors and a plurality of connection lines, and the transistors are connected to the corresponding metal wires through the connection lines; and
    a control circuit connected to the induction current transmission circuit and configured to control the transmission of the induction current.

10. The screen according to claim 9, wherein the plurality of metal wires in the induction current generation circuit are connected in parallel when the plurality of transistors are switched on.

11. The screen according to claim 9, wherein the plurality of metal wires in the induction current generation circuit are connected in series to form a multi-turn coil when the plurality of transistors are switched on.

12. The screen according to claim 9, wherein the control circuit is configured to switch on the plurality of transistors when the charging function of the screen is started and the screen is in a sleep state.

* * * * *